United States Patent [19]

Wenzel

[11] Patent Number: 4,920,734
[45] Date of Patent: May 1, 1990

[54] DRIVE CONTROL FOR WALK-BEHIND MOWER WITH HYDROSTATIC TRANSMISSION

[75] Inventor: Philip H. Wenzel, Vernon Center, N.Y.

[73] Assignee: Ferris Industries, Inc., Oneida, N.Y.

[21] Appl. No.: 409,584

[22] Filed: Sep. 15, 1989

Related U.S. Application Data

[63] Continuation-in-part of Ser. No. 276,912, Nov. 28, 1988, which is a continuation-in-part of Ser. No. 63,007, Jun. 17, 1987, Pat. No. 4,787,195.

[51] Int. Cl.[5] ............................................. A01D 69/06
[52] U.S. Cl. ...................................... 56/11.1; 56/11.3; 56/11.5; 56/11.8
[58] Field of Search ................................. 56/11.1–11.8

[56] References Cited

U.S. PATENT DOCUMENTS

| | | | |
|---|---|---|---|
| 2,689,620 | 9/1954 | Hainke | 56/11.8 |
| 2,805,536 | 9/1957 | De Vere Harnett | 56/11.5 |
| 2,818,699 | 1/1958 | Clemson | 56/11.5 |
| 3,742,685 | 7/1973 | Lian | 56/11.1 |
| 4,326,368 | 4/1982 | Hoff | 56/11.3 |
| 4,454,706 | 6/1984 | Geeck, III | 56/11.3 |
| 4,551,967 | 11/1985 | Murcko | 56/11.3 X |
| 4,558,558 | 12/1985 | Horner | 56/11.3 |
| 4,787,195 | 11/1988 | Wenzel | 56/11.1 |

*Primary Examiner*—Thuy M. Bui
*Attorney, Agent, or Firm*—Wall and Roehrig

[57] ABSTRACT

A self-propelled lawn mower employs a hydrostatic transmission and differential to power rear drive wheels which are situated behind a forward mowing deck. The hydrostatic drive has infinitely variable adjustment of speed from reverse, through neutral, to a maximum forward speed. There are independent disc brakes for the drive wheels, with right and left brake levers situated adjacent the operator hand grips. An engine has its center of gravity behind the drive wheel shaft to balance the weight of the mowing deck. Left and right thumb-operated control levers are rockably mounted on the handle bar assembly, adjacent the inboard side of the right and left hand grips. This arrangement permits one-hand control of the transmission speed with either hand, while actuating the respective brake lever with the same hand, making one-hand brake-turning of the mower possible. The engine output shaft has a pulley connected by belt drives to the blades and to the hydrostatic drive.

10 Claims, 3 Drawing Sheets

DRIVE CONTROL FOR WALK-BEHIND MOWER WITH HYDROSTATIC TRANSMISSION

CONTINUING APPLICATION DATA

This is a continuation-in-part of copending application for No. 276,912, filed Nov. 28, 1988, which is a continuation-in-part of application Ser. No. 063,007, filed June 17, 1987, now U.S. Pat. No. 4,787,195.

BACKGROUND OF THE INVENTION

This invention relates to self-propelled institutional or commercial type lawn mowers, and is especially directed to large lawn mowers intended for extended service on a daily basis, e.g., by commercial landscape gardeners or ground maintenance personnel responsible for attending to lawns at corporate or government office parks, golf courses, condominiums, and the like. The invention is especially directed to walk-behind and sulky-type riding mowers in which there is an operator position situated behind the mowing mechanism.

At present, lawn mowers of this type employ belt drives both for the mower blade and for the drive wheels. In these current mowers, each wheel is belt driven and is provided with a clutch and an individual wheel-brake which are intimately linked. The belts wear out quickly and the drive thus has a high maintenance rate. The belts also tend to slip when the grass is wet. Changing speeds requires disengaging both belts by squeezing hand calipers found on each handle bar. A speed selector control must then be adjusted to effect speed change. Because these actions take considerable time to accomplish, the operator generally opts not to make speed changes. This, however, renders precision mowing near obstacles difficult or impossible. Consequently, an intolerable amount of follow-up mowing with a hand mower or trimmer is usually required. The operator must also release his grip on the steering controls when making various machine adjustments; this can and often does lead to an accident.

These same hand calibers when squeezed to their maximum positions engage a brake which is used for turning purposes. Because the hand calipers are spring-controlled, they require considerable hand pressure to engage. This continuous hand pressure is extremely tiring. Almost continuous squeezing is required to keep the mower steering in the proper direction due to the direct-drive, non-differential type axle.

Previous walk-behind mowers generally do not have a reverse speed. Because of the excessive weight of these mowers and their uneven weight distribution, manual backing of the mower is extremely tiring on the operator and is often dangerous.

An improved mower that employs a hydrostatic transmission has been proposed in U.S. Pat. No. 4,787,195. That patent describes a self-propelled lawn mower that has a mowing deck that supports one or more mowing blades. A pair of drive wheels are rotatably supported in a power deck located behind the mowing deck. Drive linkages convey power from an engine mounted upon the power deck to the rear drive wheels and also to a blade drive system for rotating the mowing blades. An operator position is situated rearward of the drive wheels. The mower includes a handle arrangement behind the drive wheels with operator controls mounted on the handle for selectively controlling the speed and direction of the drive wheels. In the mower of that patent, a hydrostatic transmission has an input shaft driven by the engine, an output shaft arranged to turn the drive wheels, and a control shaft that is rotated to control the ratio of the output shaft speed to the input shaft speed in a continuous range of speed from reverse, through neutral, to maximum forward speed. The operator controls include a transmission control lever that is connected, for example, via a cable or a rigid linkage, to the control shaft of the hydrostatic transmission to enable the operator to select a desired drive wheel speed without removing his or her hand from the steering handle. The input shaft of the hydrostatic transmission can be vertically disposed, and the control shaft is either vertically or transversely disposed. A control lever for the hydrostatic transmission can be a C-shaped or L-shaped member that is connected at one end to the control shaft, with a control cable being connected between the control handle and this member. A cooling fan can be mounted on the shaft of the hydrostatic transmission for air cooling the same. The drive wheels are connected to the hydrostatic transmission through a differential-type drive system whose differential right and left output shafts serve as axles on which the drive wheels are mounted. These output shafts are provided with independent right and left disc brakes, with separately actuated operating levers, so that the operator can brake the wheels independently for precision steering of the mower.

The engine is mounted with its center of gravity rearward of the drive wheel shaft, to serve as a counterweight or counterpoise to balance the weight of the mowing deck. Consequently, the mower center of gravity is disposed at or close to the drive wheel axle. This aids traction significantly and facilitates steering of the machine.

The hydrstatic-drive mower can be steered in either two ways:
1. Because of the differential drive, the operator can simply apply body weight to the handle bars to make directional changes. This is impossible with previous mowers because their wheels are not differentially coupled to the drive shaft.
2. Each wheel is fitted with a disc brake which is engaged by means of a hand lever on a corresponding handle grip. Engaging the disc brake is much easier than engaging the hand brake on other mowers because there is no spring-actuated clutch in the disc brake linkage. Squeezing a selected hand caliper to engage one of the disc brakes results in an almost effortless turn toward the braked-wheel side of the machine.

These mowers can quickly turn one-hundred-eighty degrees to mow a row alongside a just-mowed row. To do this, the operator simply squeezes one brake lever, and releases the grip of the other hand. The differential drive than pulls the mower around and, and when turned, the operator simply releases the brake lever and resumes mowing.

Unfortunately, the effect of the differential drive is to transfer all of the power to the unbraked wheel at double the wheel speed that was experienced when both wheels were unbraked. This makes the mower rather difficult to control, unless the transmission control can be moved to a lower setting to keep the wheel speed even. However, in the arrangement of U.S. Pat. No. 4,787,195, the control lever is on one side of the handle bar, the operator can effect a hand brake turn only in one direction, i.e. only to the right where the control lever is mounted near the right hand grip.

OBJECTS AND SUMMARY OF THE INVENTION:

It is an object of this invention to provide a self-propelled lawn mower which avoids the drawbacks of the prior art.

It is a more specific object of this invention to provide a self-propelled mower with a transmission having both a forward and a reverse direction, and permitting infinitely variable speed selection from a reverse speed, through neutral, to a maximum forward speed.

It is more specific object of this invention to provide a self-propelled mower with a variable speed, reversing transmission that can be engaged by means of a control device immediately adjacent to the handle bar so that the operator can make speed and direction adjustments with either hand and without moving his hand from the handle bar. With one hand or both hands on the handle bar, the operator can continue to steer the machine by engaging the wheel disc brake, and/or by using operator weight on the handle bars, while at the same time making speed or forward-reverse changes by manipulating the hydrostatic control device.

It is another object of this invention to provide a self-propelled mower with a differential type drive to the rear wheels intimately connected to the variable speed hydrostatic transmission, permitting constant power distribution to both drive wheels.

It is still another object to provide a control arrangement which is actuable with either hand or with both hands, and which permits braking and transmission speed control with one hand so that the high-speed, controlled turns can be effected.

In accordance with an aspect of this invention, a self-propelled walk-behind lawn mower has a forward mowing deck that houses a cutting blade assembly that contains one or more rotary blades, a rear drive deck or power deck that contains an engine, e.g. a gasoline motor, a pair of drive wheels, a power train that couples the engine to the drive wheels, a power takeoff that connects the blade assembly to the engine, and a handle bar assembly attached onto the back of the mower for steering the drive wheels. The handle bar assembly has left and right hand grips to be grasped by the operator.

The mower has independent brakes, preferably disk brakes, for selectively braking the left and right drive wheels. For this purpose there are respective left and right independently actuable brake levers adjacent the left and right grips of the handle bar assembly.

The power train includes a hydrostatic transmission that has an input shaft driven by the engine, with a differential drive that has differential left and right output drive shafts connected to the left and right drive wheels. A speed regulator on the hydrostatic transmission permits adjusting the speed ratio of the output drive shafts to the input shaft within a continuous range from reverse, through neutral wherein the drive shafts are idle, to maximum forward.

The control assembly is positioned with operating levers on the handle bar assembly adjacent the respective grips, and is connected to the speed regulator by a speed control linkage to set the regulator at any desired position within its continuous range. This permits the operator to select a desired drive wheel speed using either hand and without having to release the grips of the handle bar assembly and without having to uncouple the transmission from the engine.

The control assembly comprises a pair of thumb levers pivotally mounted on the handle bar assembly adjacent the respective grips. These are pushed forward to move the hydrostatic transmission to a forward speed, and are pulled back to move the hydrostatic transmission to a reverse speed. The two levers are each linked through a common linkage to the actuator of the transmission, so that the speed can be controlled with either lever. This permits effective one hand braking and speed control so that the operator can carry out a high-speed handbrake turn without relinquishing the control over wheel speed. This advantage comes about because the operator can reduce the operating wheel speed, by backing off the thumb lever slightly, to counter the effect of the differential, which would otherwise double the speed of the unbraked, outer wheel.

The control assembly linkage can include a pivot rod mounted transversely beneath the mowing deck with arms that are coupled through rigid connecting rods to the thumb levers. Another arm on this pivot rod is coupled through a connecting rod to the actuator lever for the hydrostatic transmission. Motion of either or both thumb levers will rotate the pivot rod and move the actuator lever. A spring return on the mower is connected to the actuator lever so that the actuator lever will seek neutral as soon as the thumb levers are released.

The thumb levers are somewhat spoon shaped, i.e., bent forward and then receiving upward and are adjustably mounted on a rocker plate so that they can accumulate different hand sizes. This arrangement permits the operator to provide continuous pressure on the lever without significant fatigue. Also, for safety considerations, backing the mower requires pulling back on the lever or levers, and rearward motion stops as soon as the levers are released.

A belt-loop-coil operator presence switch can be included to shut the mower down if the operator loses control of the mower.

The above and many other objects, features, and advantages of this invention will be more fully understood from the ensuing detailed description of a preferred embodiment, which is to be considered in connection with the accompanying Drawing.

DETAILED DESCRIPTION OF A PREFERRED EMBODIMENT

Figure 1:
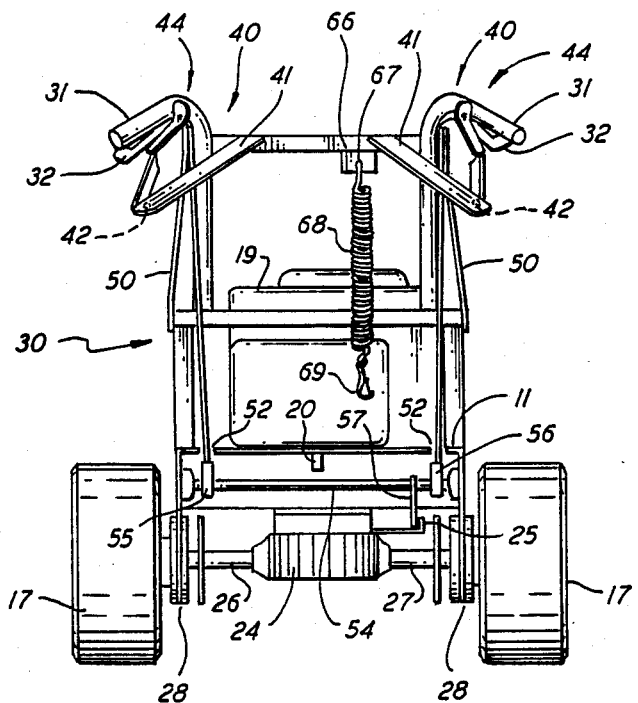
FIG. 1 is a rear elevational view of a walk-behind self-propelled power lawn mower according to a preferred embodiment of this invention.
Figure 2:
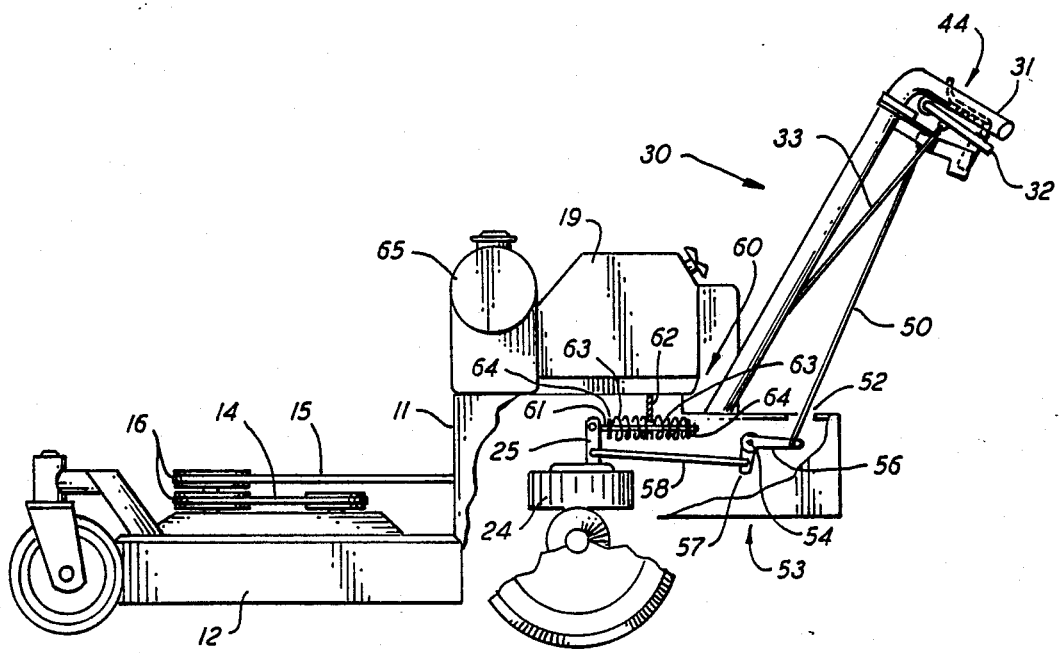
FIG. 2 is a side elevational view of the lawn mower of this embodiment, in which a portion of the mowing deck is cut away.
Figure 3:
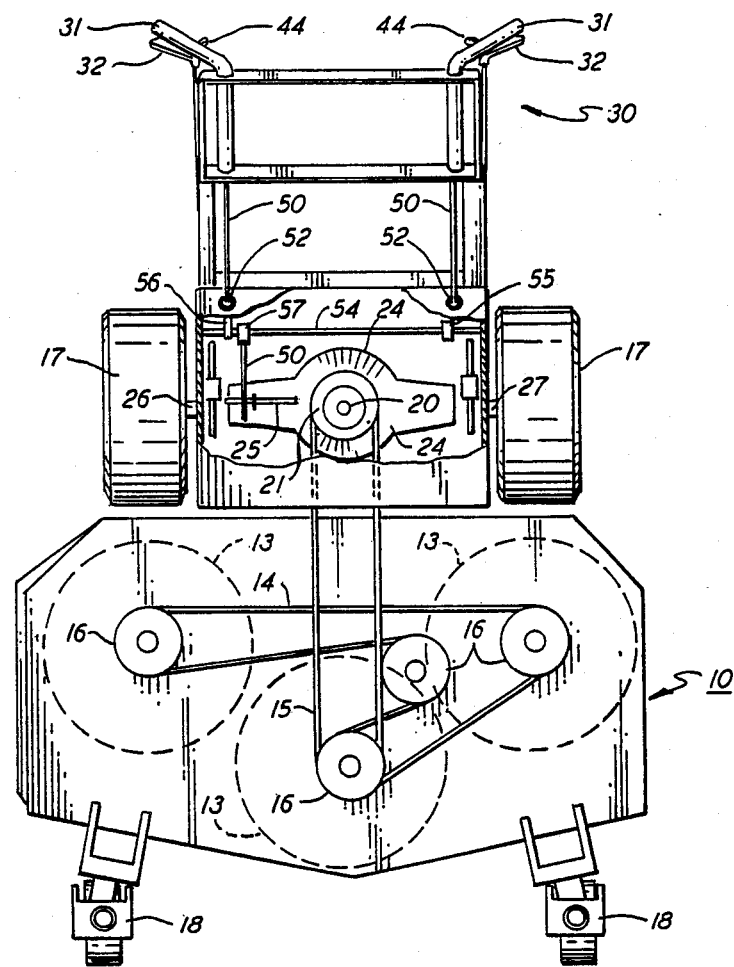
FIG. 3 is a top plan view of the lawn mower of this embodiment.

With reference initially to FIGS. 1-3 of the Drawing, a walk-behind power lawn mower is offered as an example to illustrate the principles of this invention.

The walk-behind rotary self-powered lawn mower has a mowing deck and a power deck 11 located behind the mowing deck. The mowing deck 10 is surrounded by a safety skirt or shroud 12, and contains three rotary blades 13, shown schematically in FIG. 3. The blades 13 are linked together by a secondary belt drive 14, and receive power by means of a primary belt drive 15, with belt drives 14 and 15 traveling over a system of pulleys 16 associated with the blades 13.

A pair of drive wheels 17 are here shown with large diameter tires, preferably 18×6.50 size, and are rotatably supported in the power deck. A pair of front casters 18, with foam-filled maintenance-free tires, are mounted towards the front of the power deck 10.

A gasoline engine 19, here an industrial grade engine of ten to eighteen horsepower, is mounted above the power deck. Its center of gravity is situated aft of the drive wheels 17. In this embodiment, the weight of the engine 19 serves as a balance or counterpoise for the mowing deck assembly.

Balancing the mower more or less about the drive wheel axle gives it advantages not only in steering and traction, but also in its ease of lifting the mowing deck 10 when necessary to perform maintenance or mount curbs and the like by simply pushing down on the handle section.

The engine 19 is of the vertical type, i.e., with a vertical output shaft 20 disposed over the power deck. A pulley 21 which has an incorporated electric clutch brake is mounted on the output shaft 20 and drives the primary belt 15 to provide motor power to the blades 13. Thus, the only connection between the power deck and the mowing deck is the belt drive 15 and pulley 21. Accordingly, many of the aligning and mounting problems found in other mowers are avoided.

A second pulley (not shown) also mounted on the engine output shaft 20 below the pulley 21 and is connected by a drive belt to a hydrostatic transmission 24 that is associated with the rear drive wheels 17. These elements are shown in detail in U.S. patent application Ser. No. 276,912, which is incorporated herein by reference.

The hydrostatic transmission 24 is a hydraulic transmission with a vertical input shaft that is connected to a hydraulic transaxle. In this embodiment, an Eaton Model 750 hydrostatic transmission is preferred. A fan is situated on the input shaft to draw cooling air over the housing of the transmission 24. This hydrostatic transmission 24 permits an operator to control speed and forward/reverse direction of the rear wheels 17 by means of a single operating lever, without requiring clutching.

An actuator lever 25 is mounted on the mower 10 so that one end thereof rotates a regulator or control shaft.

In a preferred embodiment the transmission 24, has a pair of horizontal-shaft ball-piston motors whose output shafts serve as right and left differential outputs shafts thereof 26 and 27, and on which the wheels 17 are respectively mounted. These output shafts 26, 27 are journalled in the power deck 11 behind the mowing deck 10. A pair of disc brakes 28 are respectively mounted on the shafts 26, 27 either inboard or outboard of the power of the power deck side.

In this embodiment a separate gear differential mechanism is not needed, for the differential function is carried out by the hydrostatic transmission.

A handle section 30, disposed rearward of the wheels 17, has right and left hand grips 31 for the operator, with respective right and left brake levers 32 pivotally mounted thereon so that the operator can operate the brakes without releasing the hand grips 31. These levers 32 are coupled by respective brake linkages 33 to the disc brakes 28. The brakes 28 each include a brake disc rotor mounted on each axle, with a respective pad assembly mounted on the sidewalls of the power deck. These disc brakes are described in the previous patent application Ser. No. 276,912 and in U.S. Pat. No. 4,787,195, and that description is incorporated herein by reference. A return spring on each brake normally holds the brake pads out of contact with the respective rotor.

Figure 5:
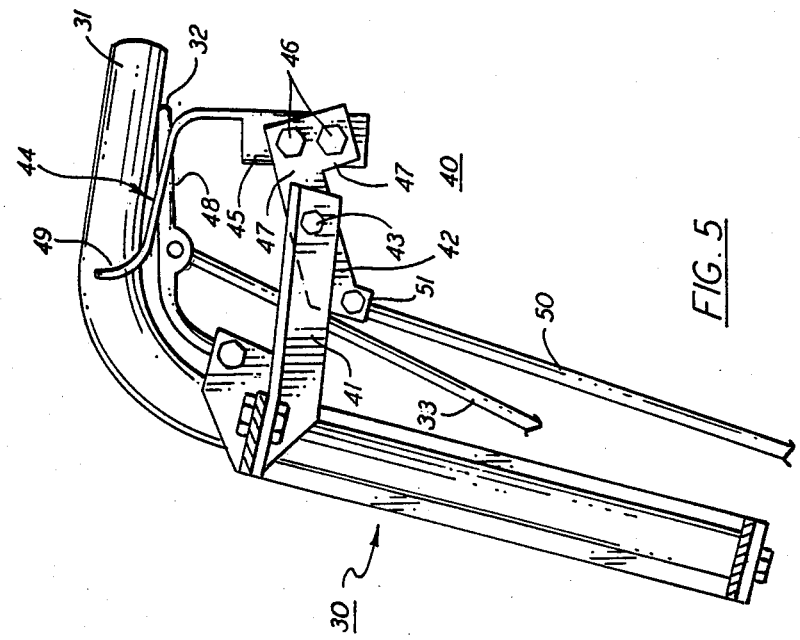
FIG. 5 is a side sectional view of the handle bar assembly and speed control lever arrangement of the preferred embodiment.
Figure 4:
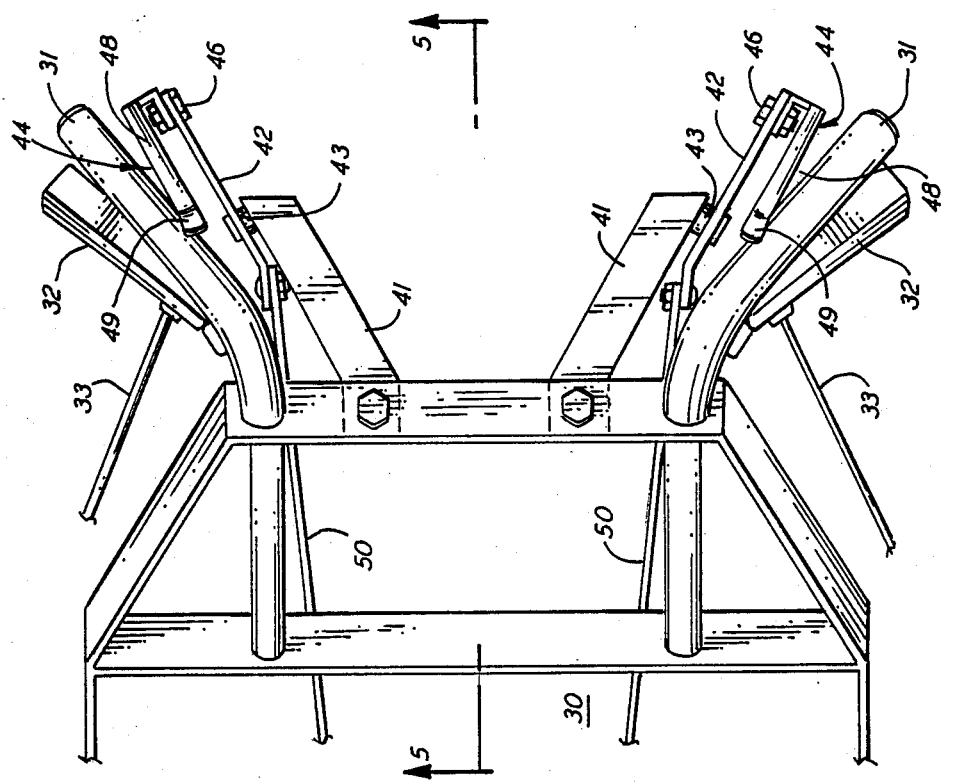
FIG. 4 is an enlargement of a portion of FIG. 3, showing the handle bar assembly and speed control assembly.

A drive control assembly 40 is shown in detail in FIGS. 4 and 5. Respective left and right mounting brackets 41 mount onto an upper end of the handle assembly and inboard of the associated grips 31.

As shown in these views, a pair of brackets 34 are provided on which the brake levers 32 are pivotally mounted and left and right mounting brackets 41 for the control assembly extend proximally from the handle bar section and inboard of the associated left and right grips 31.

At the proximal end of each of the brackets, a rocker plate 42 is mounted on a pivot 43 to define a horizontal or transverse axis.

Left and right control levers 44 are respectively mounted on the left and right rocker plates 42. For each lever 44, a vertical member 45 is adjustably mounted by bolts 46 into elongated holes 47 in the rearward or proximal end of the rocker plate 42. At an upper end of the vertical member, a portion 48 of the lever extends forward or distally along the inboard side of the associated grip 31, and a curved tip 49 extends up from the portion 48. The portion 48 and tip 49 are covered with a pad of resilient rubber-like material.

At the forward or distal end of each of the rocker plates 42, a rigid connecting rod 50 is journalled onto a depending mounting flange 51 on the rocker plate 42.

Returning to FIGS. 1, 2, and 3, the connecting rods 50 extend down through openings 52 in the rear top of the power deck 11 and are coupled to a lower linkage 53 which moves the regulator of the hydrostatic transmission 24. The lower linkage 53 comprises a transversely mounted pivot rod 54 which is journalled onto the side walls of the power deck 11. This pivot rod 54 has left and right pivot arms 55 and 56 at its end to which the left and right connecting rods 50 are joined, and also has an output pivot arm 57 which is connected by a connecting rod 58 to the actuator lever 25 for the transmission 24.

If the curved tip portions 49 of the levers 44 are pushed forward or down by the operator, the rocker plate move so as to the push downward on the connecting rods 50. This rotates the pivot rod 54 to push the connecting rod 58 and urge the arm 25 to a position corresponding to a desired forward speed. On the other hand, if the operator pulls back on either or both levers 44, the connecting rods 50 are pulled upwards, rotating the rod 54 in the opposite sense and moving the control arm 25 to a position corresponding to a reverse speed. As both levers 44 are linked by the rigid connecting rods 50 and the lower linkage 53, both levers move together, and speed control can be effected using either lever alone or both in combination.

A spring return assembly 60 beneath the mower deck 11 is coupled to the lower linkage 53 to urge the control lever 25 to a neutral position when the operator releases the control levers. In this assembly 60, a rod 61 connected to the control arm 25 extends through an opening in an aperture plate 62 that is affixed onto one side wall of the mower deck 11. A pair of springs 63 are disposed over the rod and are biased between the plate 62 and stops 64 affixed proximally and distally on the rod. The spring that urges the rod 62 and the lever 25 from the reverse to the neutral position is preferably somewhat stiffer than the other spring, which urges the rod 62 and lever 25 from the forward to the neutral position.

Other features of this mower include a fuel tank 65 mounted in advance of the motor 19 and just forward of the wheels 17 to counterbalance the rearwardly positioned motor.

As is shown in FIG. 1, an operator presence safety switch 66 here can comprise a plug 67 with a resilient plastic coil 68 coupled at one end to the plug and at another end to a belt clip 69. The plug 67 must be in place for operation, and if it is pulled out it interrupts the engine's ignition system. When the mower is in use, the belt clip 69 is fastened to the operator's clothing so that if the operator loses control of the mower, the runaway mower will pull the plastic coil, and pull the plug 67 out of the switch 66.

A number of other, standard features have been omitted from the drawing but would be present on the mower. These would include an ignition switch, a throttle lever for the motor 19, and a cover for the mower deck 10.

Unlike other mowers, with the mower of this invention it is not necessary to disengage any belts to effect a directional change. In other similar lawn mowers, a spring actuated clutch disengages an associated drive belt. This requires strong gripping action to actuate the turn, and because directional changes are frequent, steering with these belt-driven mowers can be exhausting and difficult work. The belts are also exposed to constant wear as they are clutched in an out of engagement, thus requiring frequent belt replacement.

However, with the mower of the present invention, each wheel is fitted with a disc brake which is engaged by means of an independent hand caliber on the corresponding handle grip 31. Engaging the disk brake is much easier than engaging the hand brake on the other mowers, because there is no spring actuated clutch in the present invention brake linkage. Squeezing a selected hand caliber to engage one of the disc brakes results in an almost effortless turn towards the brakedwheel side of the machine. The operator can change speeds and engage the wheel brakes simultaneously, permitting turning of the sharpest possible corners. Because the operator can brake with one hand and control the speed of the transmission 24 with the same hand resting on the associated control lever 44, one-hand handbrake turns are very simple to execute with complete control of the mower speed. This compensates for any tendency of the mower to speed up by virtue of the differential increasing wheel speed to the unbraked wheel.

Because of the excellent control over this mower, an operator can trim close to walls or plantings. This precision in mowing eliminates most of the trimming and follow up hand mowing that is required if other mowers are employed. Also, because of its steering precision, a much wider mowing deck can be employed than with the previously-proposed mowers, which further reduces mowing time and operator fatigue.

Because there are no belts associated with the rear drive wheels, or disposed beneath the mowing deck, moisture will not affect the drive linkages or slow down the mower operation. The heavy-duty hydrostatic transmission 24 requires little maintenance, and exhibits long life. When servicing is required, only simple hand tools and basic mechanical skills are required, and routine maintenance requires much less time than is needed for belt-driven mowers. If the mowing deck must be removed for some reason, the drive belt that connects it with the engine can be easily detached and reinstalled without difficulty.

While the invention has been described in detail with respect to a single preferred embodiment, the invention is certainly not confined to the details set forth regarding that embodiment, and this application is intended to cover many modifications and variations without departing from the scope and spirit of the invention, as defined in the appended claims.

What is claimed is:

1. A self-propelled mower that comprises:
   a front mowing deck housing a blade assembly containing one or more movable blades,
   a rear power deck containing an engine, a pair of drive wheels, and a power train coupling the engine to the drive
   wheels, power take off means for connecting the blade assembly to the engine,
   handle bar means attached to the back of the power deck for steering the drive wheel, and handle bar means having left and right grips,
   independent brake means for selectively braking the left and right drive wheels including independently actuable brake levers adjacent the left and right grips of said handle bar means,
   said power train further including a hydrostatic transmission having an input shaft means connected to the engine and differential drive means with right and left drive wheels and a speed regulator to set the speed ratio of the drive shaft means to the input shaft means within a continuous range from reverse through neutral, wherein the drive shaft means are idle, to maximum forward; and
   control means positioned on the handle bar means and connected to the speed regulator by a speed control linkage for setting the regulator at any desired position within the continuous range so that the operator can select a desired drive wheel speed without releasing the handle bar means or uncoupling the transmission from the engine, said control means including left and right speed control levers mounted on said handle bar means respectively adjacent said left and right grips for rocking motion about a transverse axis, and with said speed control linkage connecting said speed control levers to said regulator to permit an operator to control the speed and direction of motion of the mower with either hand without removing that hand from the respective grip.

2. The mower of claim 1 wherein said independent brake means include right and left disc brakes each associated with a respective one of the right and left output drive shaft means.

3. The mower of claim 1 wherein each of said brake levers includes a main lever portion pivoting with respect to an associated one of the said grips and extending generally parallel thereto.

4. The mower of claim 1 wherein said speed control linkage includes a pivot rod that is transversely mounted below the mower deck, left and right arms that extend from the pivot rod at left and right ends thereof and which are connected by respective rigid connecting rods to said left and right speed control levers, and an output arm on said pivot rod that is connected by a rigid connecting rod to the regulator of the hydrostatic transmission, such that motion of either of said control levers rotates the pivot rod and moves the regulator to a speed setting within its speed range.

5. The mower of claim 1 wherein said control means includes for each said control lever a mounting bracket mounted on said handle bar means inboard of the associated grip, a rocker plate pivotally mounted on said bracket on a horizontal axis, and means for adjustably mounting the associated control lever on said rocker plate rearward of said horizontal axis.

6. The mower of claim 5 wherein said control levers are each constructed with a mounting plate that is adjustably attached to said rocker plate, and a thumb lever that extends forward from the mounting plate and curves upward adjacent the associated grip at the inboard side thereof.

7. The mower of claim 6 further including a resilient grip pad on each of said thumb levers.

8. The mower of claim 1 wherein said speed control linkage further includes a regulator lever connected to the transmission speed regulator, and resilient biasing means for urging said regulator lever to a position correspond to the neutral position of the speed regulator so that the transmission reverts to its neutral position if the operator releases both said speed control levers.

9. The mower of claim 8 wherein said resilient biasing means includes a rigid member attached to said regulator lever, a plate mounted on the power deck through which said rigid member passes, and a pair of springs biasing against said plate and against stops on said rigid member for respectively urging the regulator lever from a forward position to the neutral position and from a reverse position to the neutral position.

10. The mower of claim 9, wherein the spring that urges the regulator lever from the reverse position to the neutral position is stiffer than the spring that urges the lever from forward position to the neutral position.

* * * * *